(12) United States Patent
Spinelli

(10) Patent No.: US 7,193,332 B2
(45) Date of Patent: Mar. 20, 2007

(54) METHODS AND APPARATUS FOR GENERATING POWER FROM VEHICLES

(75) Inventor: Thomas Spinelli, East Northport, NY (US)

(73) Assignee: Omnitek Partners LLC

( * ) Notice: Subject to any disclaimer, the term of this patent is extended or adjusted under 35 U.S.C. 154(b) by 143 days.

(21) Appl. No.: 10/972,547

(22) Filed: Oct. 25, 2004

(65) Prior Publication Data
US 2006/0087201 A1   Apr. 27, 2006

(51) Int. Cl.
F02D 20/12   (2006.01)

(52) U.S. Cl. .................... 290/1 R; 290/44; 290/55; 180/165; 310/339

(58) Field of Classification Search ............ 290/1 R, 290/44, 55; 180/165; 310/339
See application file for complete search history.

(56) References Cited

U.S. PATENT DOCUMENTS

| 4,404,490 | A  | * | 9/1983  | Taylor et al. ............ 310/339 |
| 5,272,378 | A  | * | 12/1993 | Wither ..................... 290/1 R |
| 5,920,127 | A  | * | 7/1999  | Damron et al. ............ 290/44 |
| 6,373,145 | B1 | * | 4/2002  | Hamrick ................... 290/44 |
| 6,700,215 | B2 | * | 3/2004  | Wu .......................... 290/44 |
| 6,734,575 | B2 | * | 5/2004  | Ricketts .................. 290/1 R |
| 6,838,782 | B2 | * | 1/2005  | Vu ........................... 290/55 |
| 6,857,492 | B1 | * | 2/2005  | Liskey et al. ............ 180/165 |
| 6,897,575 | B1 | * | 5/2005  | Yu ............................ 290/44 |
| 6,923,552 | B2 | * | 8/2005  | Tseng ...................... 362/192 |

* cited by examiner

*Primary Examiner*—Darren Schuberg
*Assistant Examiner*—Iraj A. Mohandesi

(57) ABSTRACT

A method for generating power from a moving vehicle is provided. The method comprising: positioning at least one device for converting an airflow from a passing vehicle into power near a path of the moving vehicle; and generating power from the at least one device at least partially from the airflow.

19 Claims, 12 Drawing Sheets

METHODS AND APPARATUS FOR GENERATING POWER FROM VEHICLES

FIELD OF THE INVENTION

The present invention relates generally to methods and apparatus for generating power from vehicles, and more particularly, to methods and apparatus for generating power from wakes caused by passing vehicles.

BACKGROUND OF THE INVENTION

Automobiles and other vehicles are responsible for a majority of the energy used in the modern day. What is needed in the art is a way to recoup some of the energy used to propel and operate automobiles and other vehicles.

SUMMARY OF THE INVENTION

It is an object of the present invention to provide methods and apparatus for generating power from vehicles.

Accordingly, a method for generating power from a moving vehicle is provided. The method comprising: positioning at least one device for converting an airflow from a passing vehicle into power near a path of the moving vehicle; and generating power from the at least one device at least partially from the airflow.

The method can further comprise supplying the generated power to a power grid. The method can further comprise supplying the generated power to a power-consuming device. The method can further comprise supplying the generated power to an energy storage device.

The at least one device can comprise a plurality of devices and the positioning comprises disposing the plurality of devices along the path in a direction of travel of the moving vehicle.

The positioning can comprise disposing the at least one device in or on a roadway divider. In which case, the roadway divider can separate the path from another path.

The positioning can comprise disposing the at least one device in or on a roadway. The positioning can comprise disposing the at least one device in or on a surface of an underpass. The surface can be a side surface of an interior of the underpass. The surface can also be a top surface of an interior of the underpass.

The at least one device can comprise an electric generator and the generating can comprise spinning the generator with the airflow. The at least one device can comprise a piezo generator and the generating can comprise vibrating the piezo generator with the airflow.

The method can further comprise: determining a characteristic of the passing vehicle; and changing the positioning of the at least one device based on the characteristic. The characteristic can be an airflow field generated from the passing vehicle. The characteristic can be at least one of a detected shape, size, and speed of the passing vehicle.

Also provided is an apparatus for generating power from a moving vehicle. The apparatus comprising: at least one device for converting airflow from a passing vehicle into power; and means for supplying the power to one of a power grid, energy storage device, and power-consuming device.

The at least one device can comprise an electric generator. The at least one device can comprise a piezo generator.

The apparatus can further comprise a body for containing the at least one device. The body can comprise a mounting means for mounting the body to another object. The mounting means can comprise a flange having one or more fastener holes. The mounting means can comprise a stand.

The apparatus can further comprise: means for determining a characteristic of the passing vehicle; and means for changing a position of the at least one device based on the characteristic. The characteristic can be an airflow field generated from the passing vehicle and the means for determining a characteristic of the passing vehicle comprises one or more sensors for detecting the airflow field. In which case the means for changing the position of the at least one device based on the characteristic can comprise one or more actuators operatively connected to the at least one device for changing the position of the at least one device based on the detected airflow field. The characteristic can be at least one of a detected shape, size, and speed of the passing vehicle and the means for determining a characteristic of the passing vehicle comprises a computer vision system having at least one camera for detecting at least one of the detected shape, size, and speed of the passing vehicle and calculating an expected airflow field therefrom. In which case the means for changing the position of the at least one device based on the characteristic comprises one or more actuators operatively connected to the at least one device for changing the position of the at least one device based on the calculated expected airflow field.

Still further provided is a roadway divider for generating power from a moving vehicle. The roadway divider comprising: a body; at least one device for converting an air flow from a passing vehicle into power supported by the body; and power transmission means for supplying the power to one of a power grid, energy storage device, and power-consuming device.

The at least one device can comprises a plurality of devices connected in series.

The roadway divider can further comprise an electrical connector for connecting a power output from the roadway divider to another roadway divider. The body can further have a mechanical connector for mating the body of the roadway divider to a body of the other roadway divider, wherein the electrical connector operatively connects with another electrical connector of the other roadway divider upon mating of the mechanical connector to the body of the other roadway divider.

The at least one device can be integrally formed in the body. The at least one device can be fastened to a surface of the body.

The at least one device can be an electrical generator, the electrical generator having a fan rotatably connected to a shaft of the electrical generator, wherein the air flow spins the shaft to produce the power. The electrical generator can have an input in communication with the air flow for directing the airflow to the fan. The electrical generator can have a second input in communication with an air flow from another moving vehicle, each of the air flows combining to spin the shaft to generate power.

The at least one device can be a piezo generator, the piezo generator having a piezo member wherein the airflow vibrates the piezo member to produce the power.

Still further provided is an apparatus for generating power from airflow generated by a moving vehicle. The apparatus comprising: means for converting the airflow to power; and means for supplying the power to one of a power grid, energy storage device and power-consuming device.

Still yet further provided is an apparatus for producing power from airflow generated by a moving vehicle. The apparatus comprising: at least one device for converting the air flow to power; and one or more electrical conductors for supplying the power to one of a power grid, energy storage device and power-consuming device.

The apparatus can further comprise electrical conditioning means for converting the power to correspond to an input requirement of the one of the power grid, energy storage device and power-consuming device.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

Although this invention is applicable to numerous and various types of vehicles, it has been found particularly useful in the environment of automobiles and trucks driven on roadways. Therefore, without limiting the applicability of the invention to automobiles and trucks driven on roadways, the invention will be described in such environment. However, those skilled in the art will appreciate that the present invention is also applicable to other vehicles, such as railed vehicles, boats, and aircraft.

Figure 1:
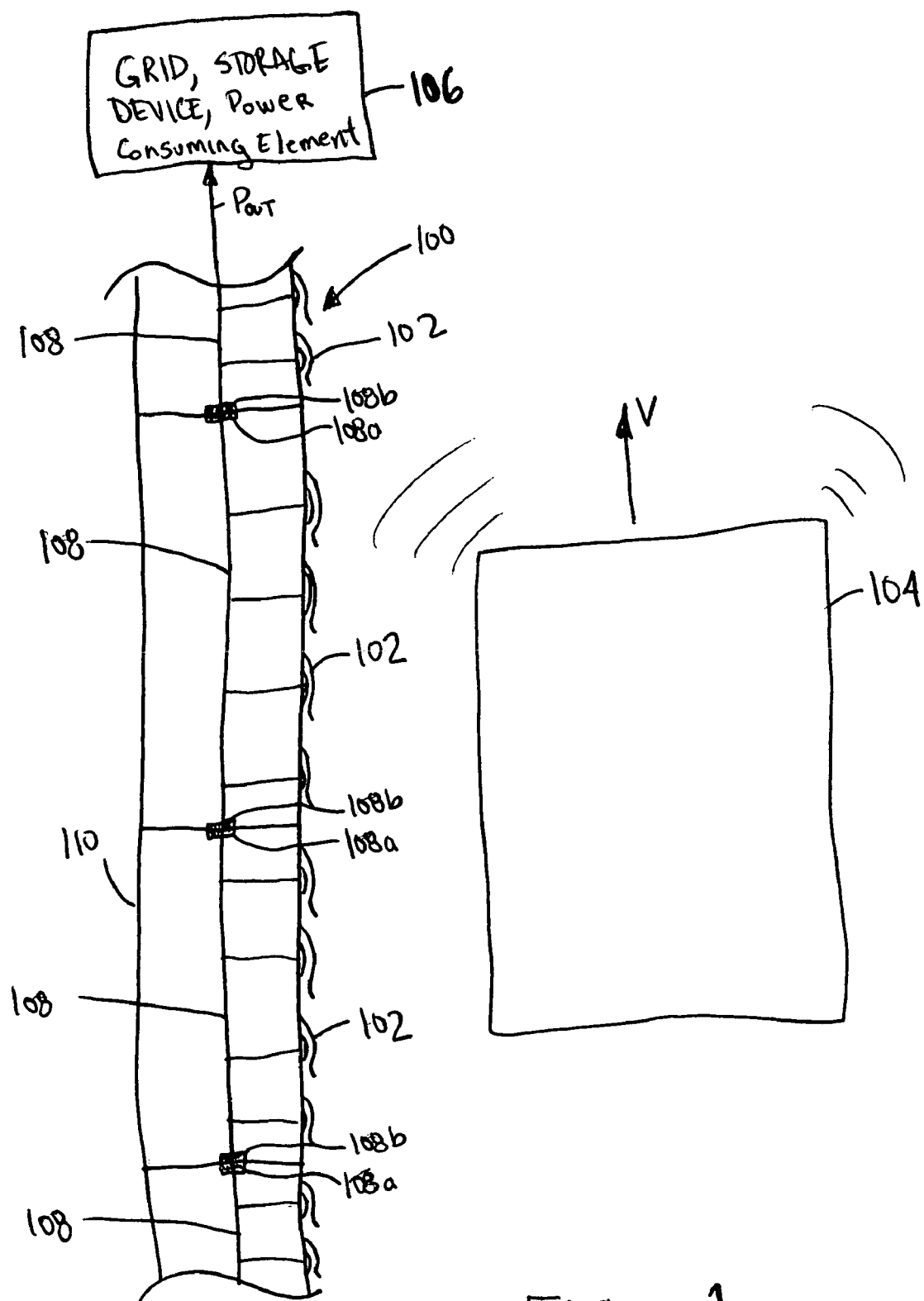
FIG. 1 illustrates a plan view of a moving vehicle and a roadway divider having apparatus of the present invention for generating power from the moving vehicle.

Referring now to FIG. 1, there is illustrated an apparatus for generating power from a moving vehicle according to an embodiment of the present invention, the apparatus being generally referred to by reference numeral 100. The apparatus 100 comprises at least one device 102 for converting airflow from a passing vehicle 104 into power. The apparatus also comprising means for supplying the power to one of a power grid, energy storage device, or power-consuming device, the means being shown schematically by element 106. As discussed below, the device 102 can be an electric generator or piezo generator or any other device now known or later developed that can convert the airflow from the passing vehicle 104 into power. Such devices 102 preferably produce a direct current (DC) output. The means 106 for supplying the generated power is well known to those of ordinary skill in the art of power generation, power storage, and/or power transmission for devices having a DC output. Although the devices 102 preferably have a DC output, they may also have an alternating current (AC) output without departing from the scope or spirit of the present invention. The means 106 is assumed to have any necessary (if any) electrical conditioning means for converting the power to correspond to an input requirement of the power grid, energy storage device or power-consuming device. The energy storage device may simply be a battery, plurality of batteries, a capacitor or an ultra-capacitor. The power-consuming device may be roadway lights or a roadway emergency phone.

As also shown in FIG. 1, a plurality of the devices 102 are preferably provided along a path of the passing vehicle 104. The plurality of devices 102 may be provided on a roadway divider 108 and the roadway dividers 108 may be coupled together along the path of the moving vehicle 104, such as between lanes of a highway or between oncoming and outgoing traffic on a highway. The roadway dividers 108 can be conventional concrete traffic dividers having the devices 102 integrated therein, as discussed below. The roadway dividers 108 may be not only physically coupled but also electrically coupled such that the output of the devices 102 from each divider is output to a common electrical line 110 that feeds into the means 106. The individual devices 102 from each divider 108 may each supply their generated power to the common electrical line 110 or the generated power from each of the devices may first be combined for a subgroup of the devices 102 (such as for the divider 108) that is then fed to the common electrical line 110.

Figure 2:
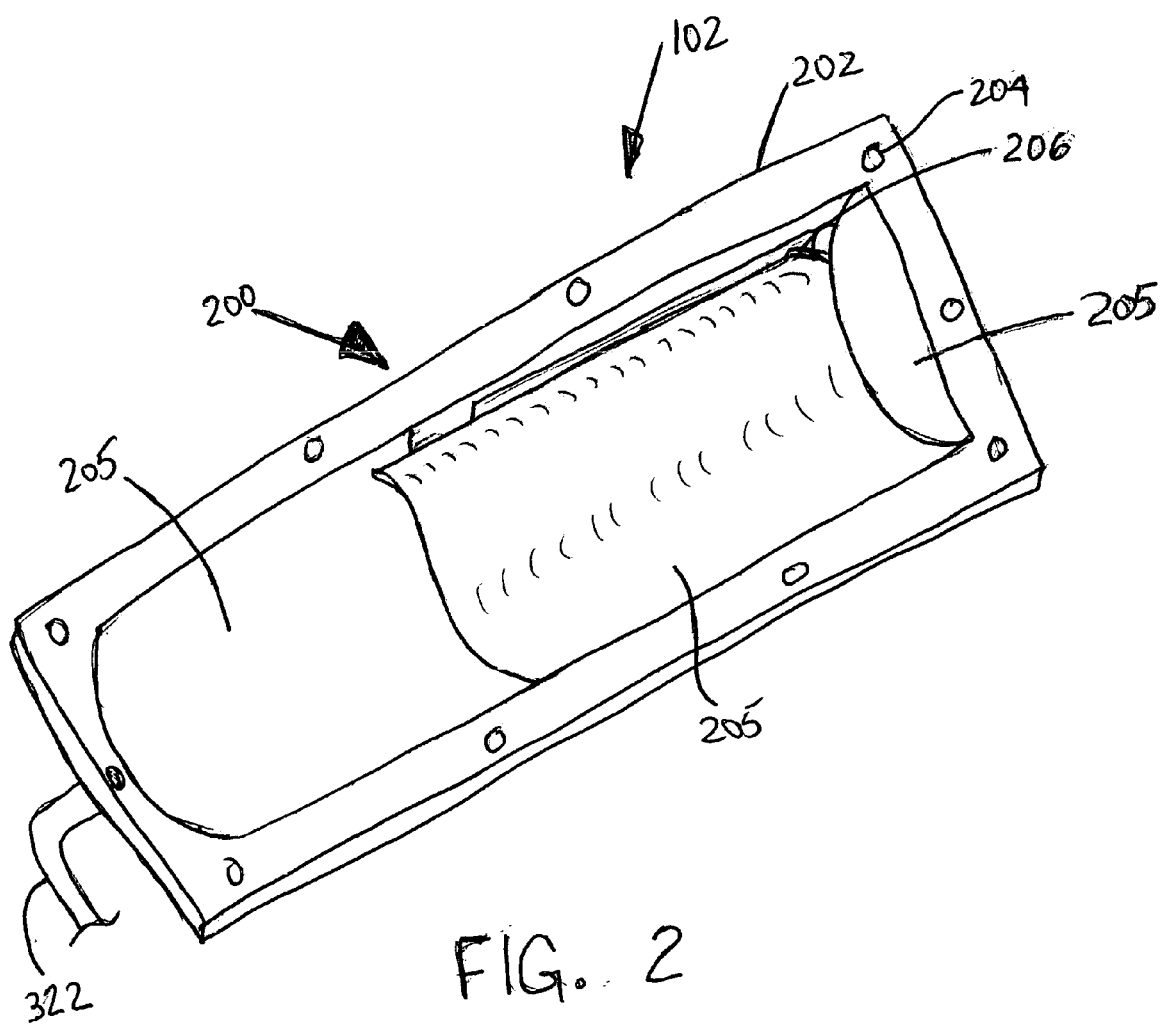
FIG. 2 illustrates an embodiment of a device of the apparatus of FIG. 1.

Referring now to FIG. 2, the device 102 is illustrated therein apart from the divider 108. The apparatus has a body 200 for containing the device 102. The body 200 can have a mounting means for mounting the body to another object, such as the divider 108. The mounting means can comprise a flange 202 having one or more fastener holes 204. As discussed below with reference to FIG. 6, the mounting means can also comprise a stand for supporting the device 102. Referring back to FIG. 2, the body further has a covering 205 for covering the internal components of the device 102 and for defining an interior of the body 200. The covering can have an input for deflecting the airflow into an interior of the body 200. The portion for deflecting the airflow can comprise an out-turned portion 206 for catching a portion of the airflow and directing it into the interior of the body 200.

Figure 3:
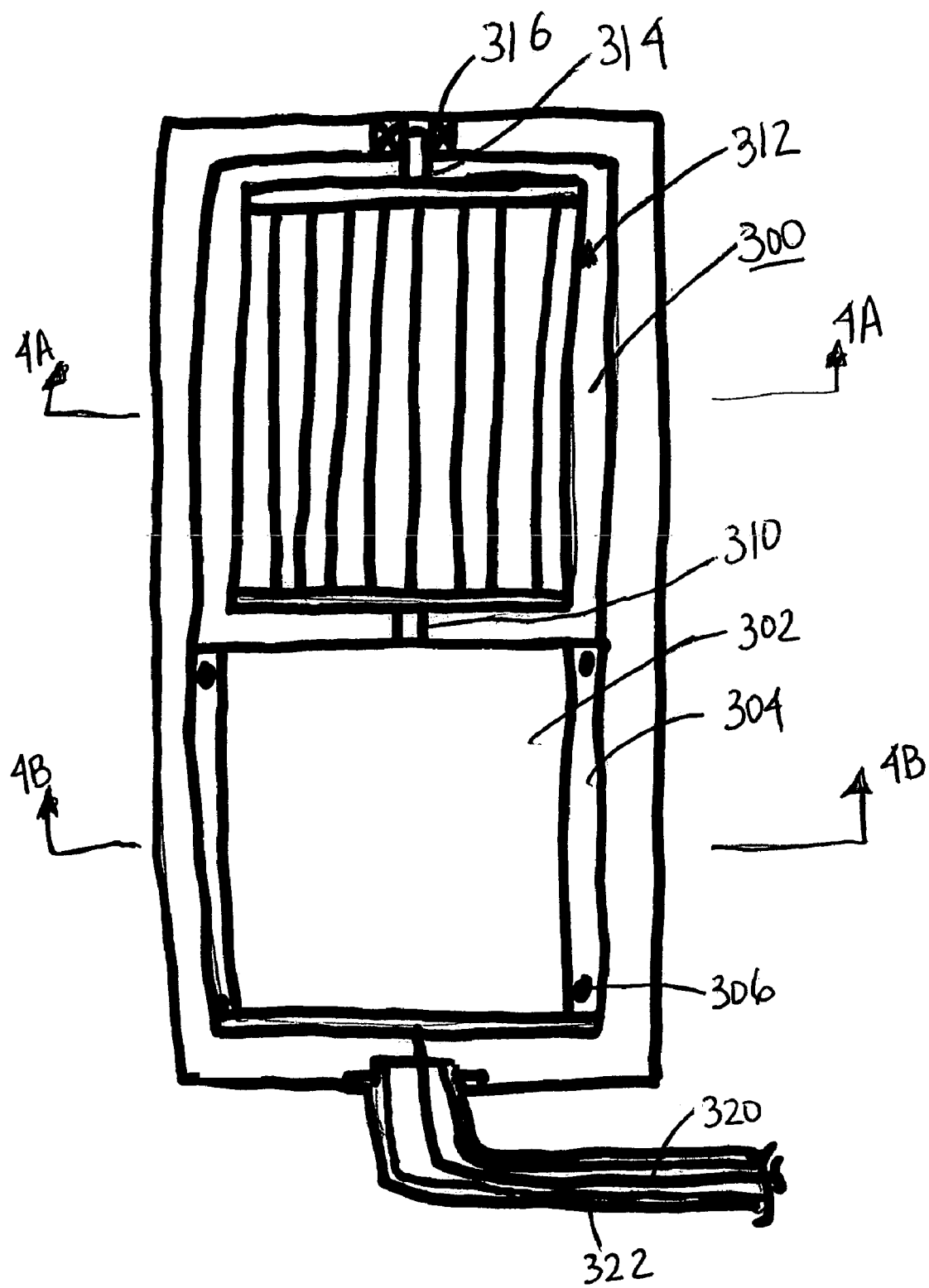
FIG. 3 illustrates a sectional view of the device of FIG. 2.

Referring now to FIG. 3, the same illustrates the body without the covering 205 to expose an interior 300 of the body 200. The interior holds an electrical generator 302 mounted to the body 200 by way of a flange 304 and fasteners 306. Operation of electrical generators 302 is well known in the art and generally comprise electrical windings 308 (as shown in FIG. 4B), the relative rotation thereof produces an electrical current. The electrical generator 302 has a rotatable shaft 310 attached to one of the electrical windings 308. The interior 300 also houses a fan, such as a squirrel cage 312, which is attached to the shaft 310. The squirrel cage 312 may also have a shaft 314 (or the shaft 310 of the electrical generator 302 may extend through the squirrel cage 312) which is rotatably fixed in the covering 202 of the body, such as by way of a bearing 316 disposed in the covering 202.

Figure 4A:
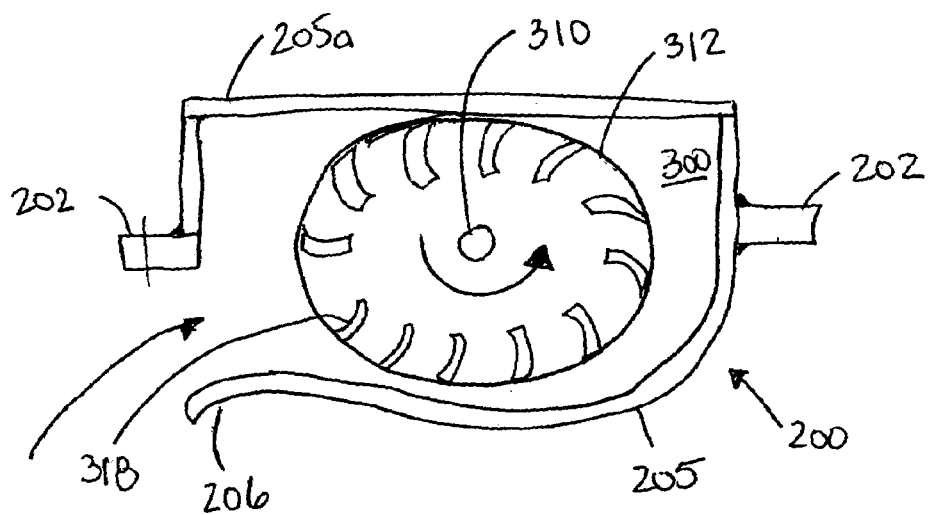
FIGS. 4A and 4B illustrate sectional views of the device of FIG. 2.
Figure 4B:
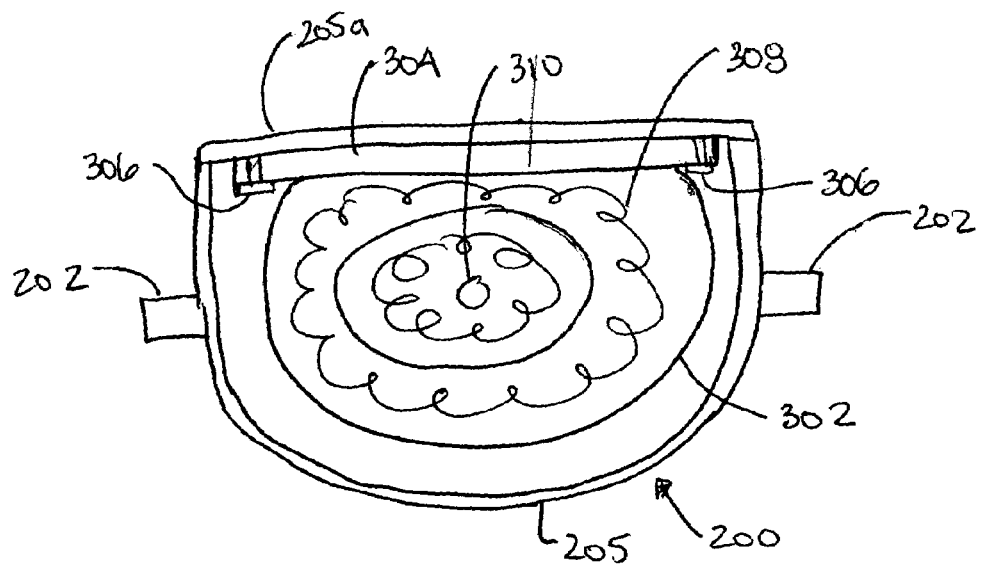
Figure 7A:
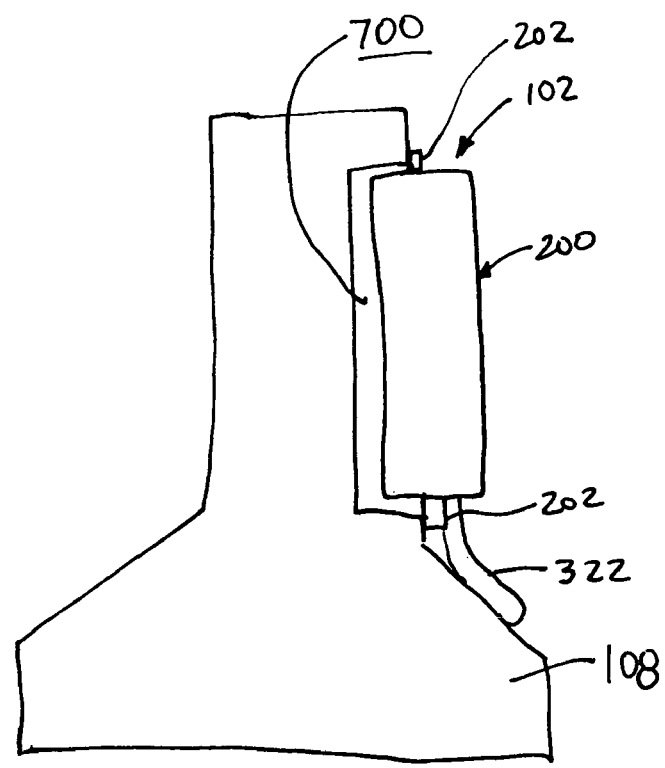
FIGS. 7A and 7B illustrate sectional views of a roadway divider having an apparatus of the present invention for generating power from a moving vehicle.
Figure 7B:
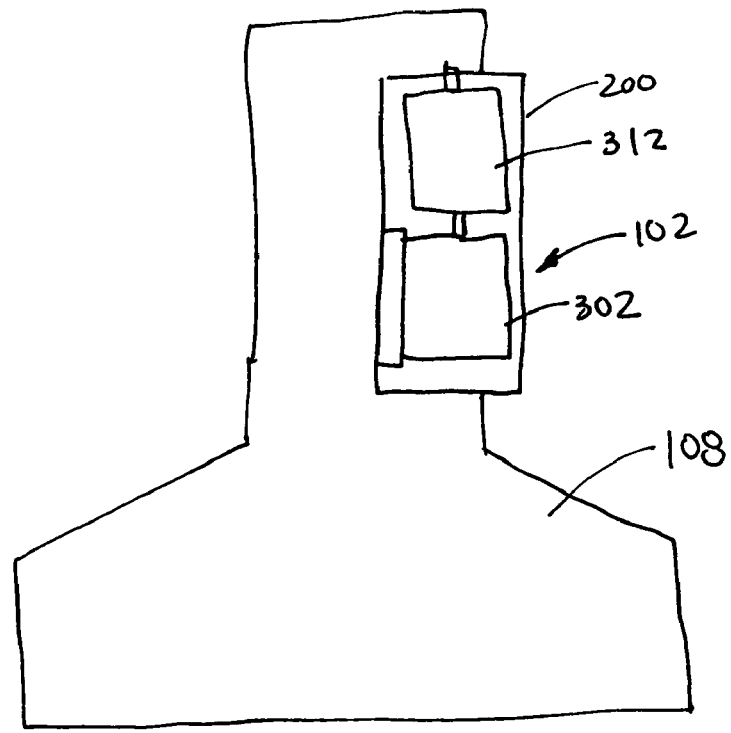

Referring now to FIG. 4A, a sectional view of the body 200 and squirrel cage 312 is shown. The squirrel cage 312 has individual blades 318 disposed around the shaft 310 (or 314). The body 200 is mounted to the divider 108 by means of the flange 202. The flange 202 can be flush with a back surface 205a of the covering 205 such that the body 200 is mounted to a surface of the divider 108 by appropriate fasteners. Alternatively, the flange 202 can be provided offset from the back surface 205a as is shown in FIGS. 4A and 4B and the divider 108 can be provided with a cavity 700 (see FIG. 7A) corresponding to each body 200 to be mounted thereon such that the flange 202 may still be mounted on a surface of the divider 108 with a portion of the body 200 being accommodated in the cavity. Alternatively, the device 100 can be integrally formed in the roadway divider 108 such as is shown in FIG. 7B.

Once mounted, the airflow from a passing vehicle is captured by the out-turned portion 206 and is directed to the blades 318 which cause a rotation of the squirrel cage 312 and the electrical generator 302 connected thereto. Consequently, the electrical generator 302 produces an electrical power that is output via appropriate wiring 320. The wiring 320 can be integrally formed in the divider 108 or run within a conduit 322 that can be attached to a surface of the divider 108. The roadway divider 108 can further comprise an electrical connector for connecting a power output from the roadway divider 108 to another roadway divider 108. The electrical connectors may simply be mating conductive plates 108a, 108b at abutting ends of the dividers 108. The electrical connector (not shown) can be a mechanical connector which mates one roadway divider 108 to another roadway divider 108 upon mating (abutting) of the mechanical connector to the other roadway divider 108.

Figure 5:
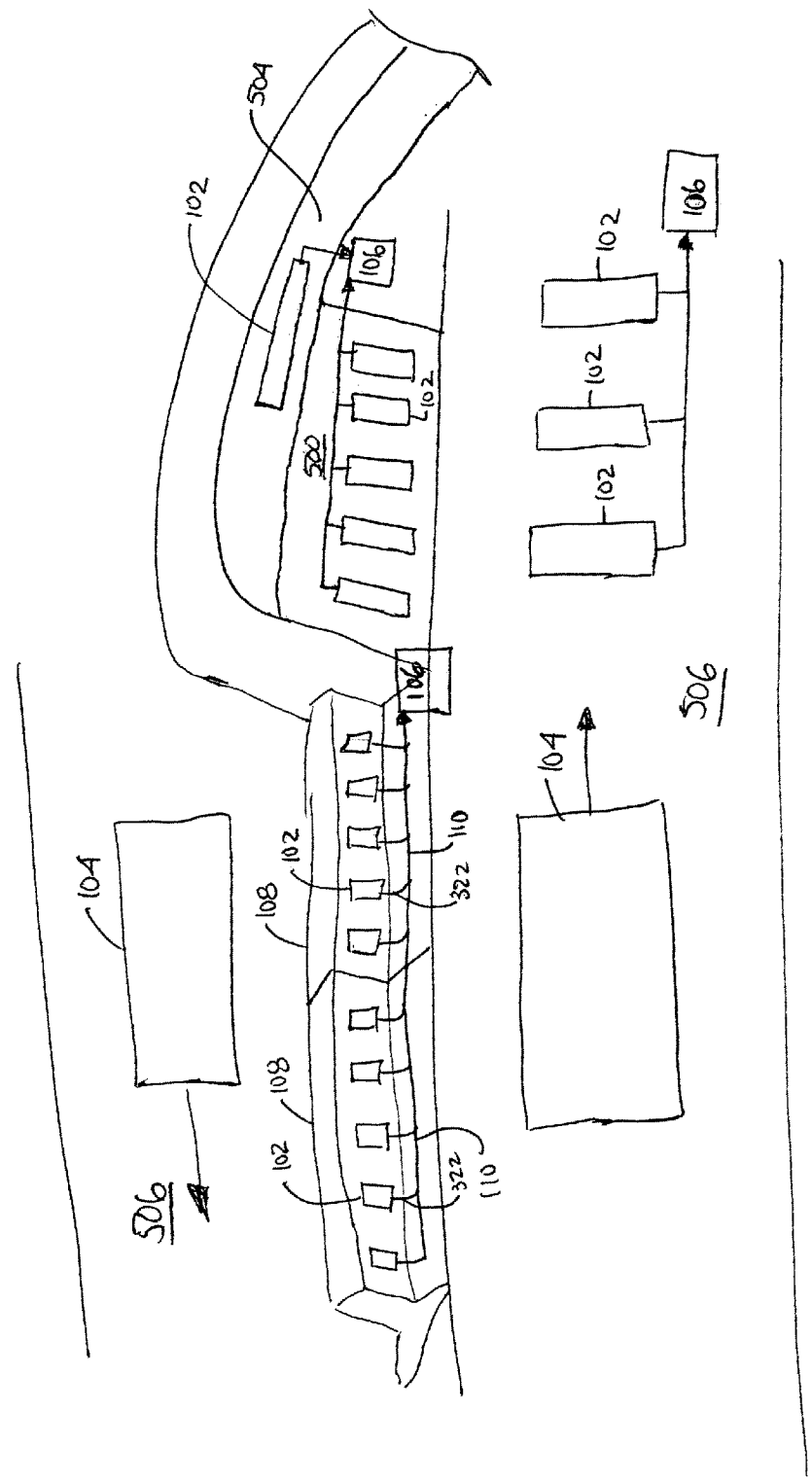
FIG. 5 illustrates a plan view of a moving vehicle and a roadway divider, roadway, and tunnel, each having apparatus of the present invention for generating power from the moving vehicle.

Referring now to FIG. 5, the devices 102 can also be disposed on other surfaces proximate to the passing vehicle, such as on vertical sections 500 of an overpass (tunnel) 502, horizontal sections 504 of the overpass 502 and even on the roadway surface 506 itself. No matter where disposed, the devices 102 are preferably operatively connected with the means 106 for supplying the power to one of a power grid, energy storage device, and power-consuming device.

Figure 6:
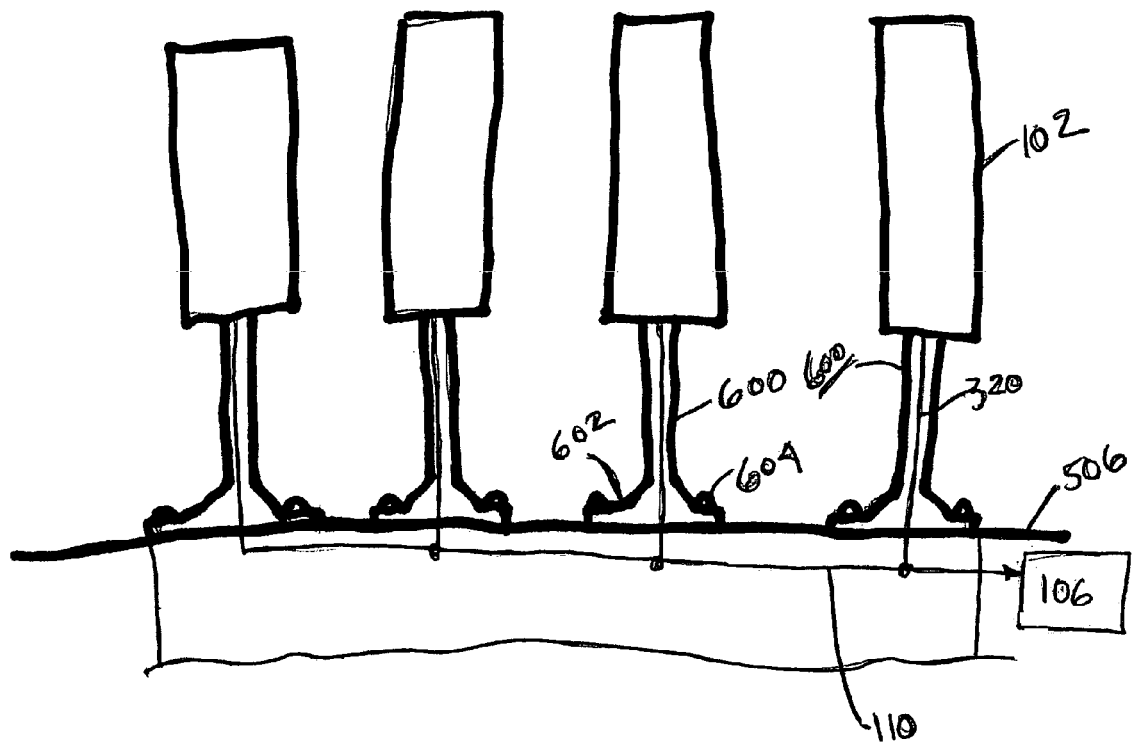
FIG. 6 illustrates another embodiment of an apparatus of the present invention for generating power from a moving vehicle.
Figure 7C:
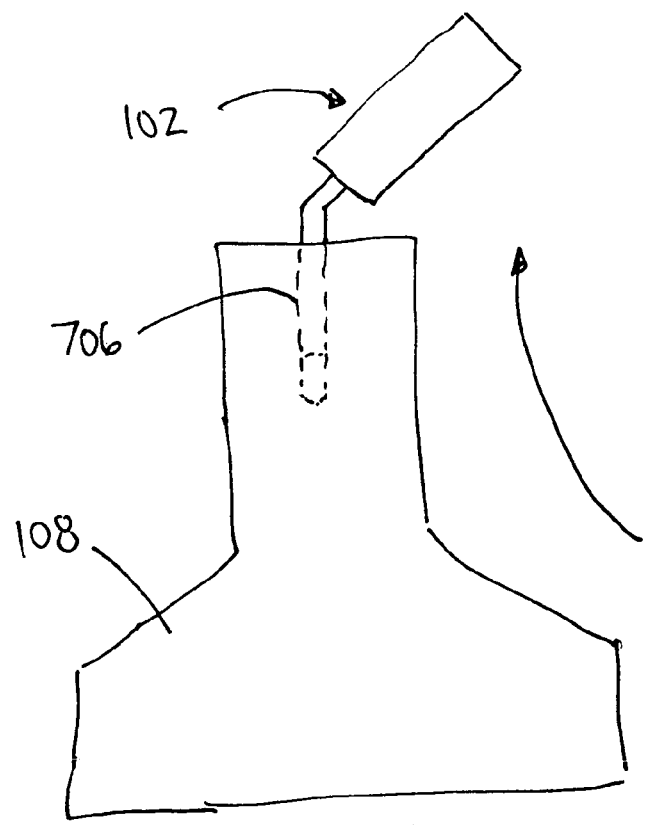
FIGS. 7C and 7D illustrate side and front views of a roadway divider having an apparatus of the present invention for generating power from a moving vehicle.
Figure 7D:
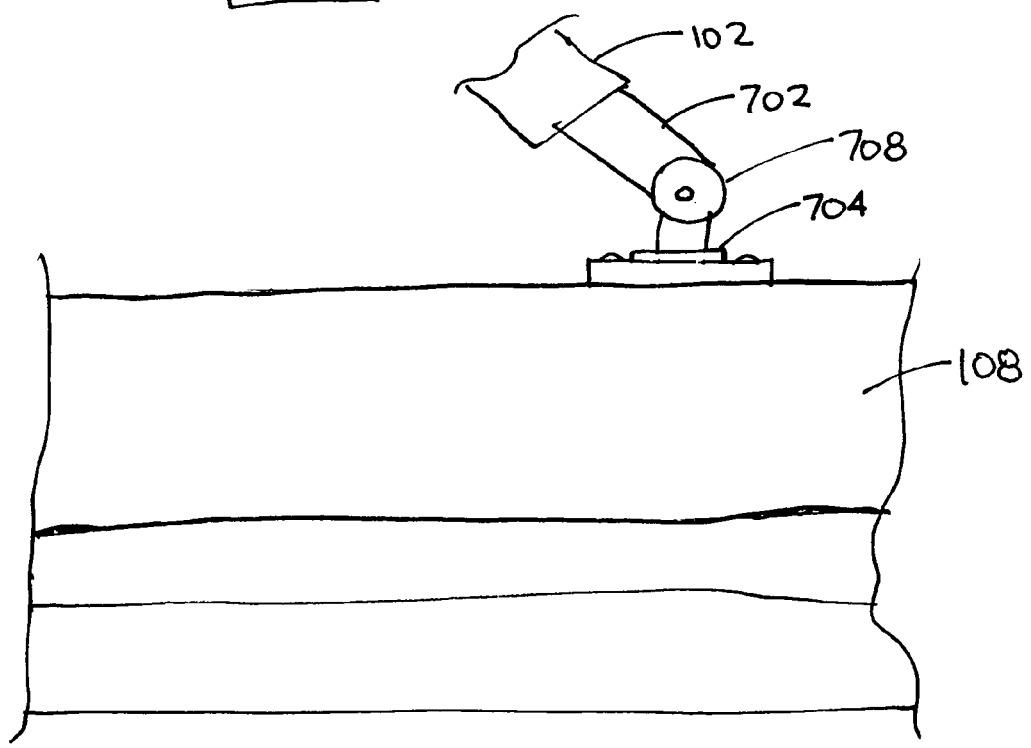

FIG. 6 illustrates devices 102 as discussed above which are mounted proximate the path of the passing vehicle mounted to a roadway 506 by way of stands 600. The stands 600 may have mounting flanges 602 for attachment to the roadway 506 by way of fasteners 604. The stands 600 may also have a portion embedded beneath the roadway for securing the stands therein. The output wires from each of the devices 102 preferably run within a conduit 606 formed in the stand and attach to other wires or a common line 110 under or on top of the roadway. Similarly to that discussed above with regard to the roadway dividers 108, the stands 600 may have a mechanical electrical connector (not shown) which mates with another connector on the roadway 506. As shown in FIGS. 7C and 7D, the devices 102 can also be mounted to other surface, such as to surfaces of a roadway divider 108 by way of stands 702. The stands 702 may have a flange 704 similar to that described with regard to FIG. 6, or may have a portion 706 embedded within the roadway divider 108. As shown in FIGS. 7B and 7C, the devices 102 may be angled with respect to the roadway to optimize the efficiency at which they convert the airflow from the passing vehicles to electrical power. The articulation may be varied and locked in place by use of one or more articulating joints 708.

Figure 8A:
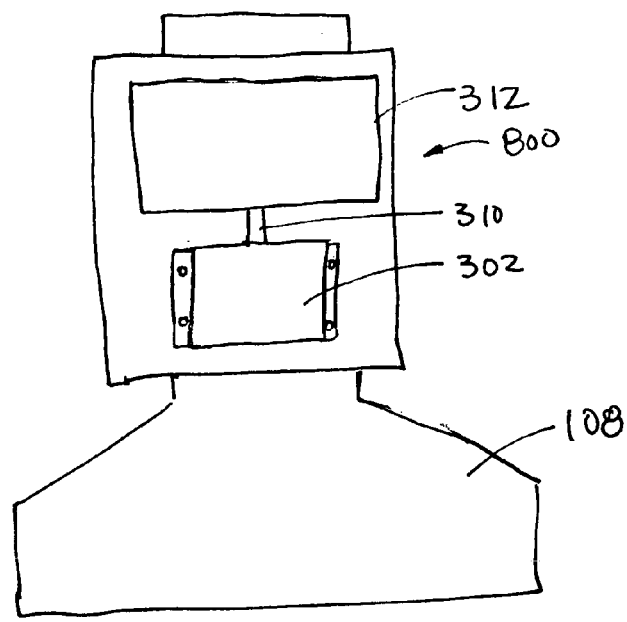
FIGS. 8A and 8B illustrate sectional top and front views of a roadway divider having an apparatus of the present invention for generating power from a moving vehicle.
Figure 8B:
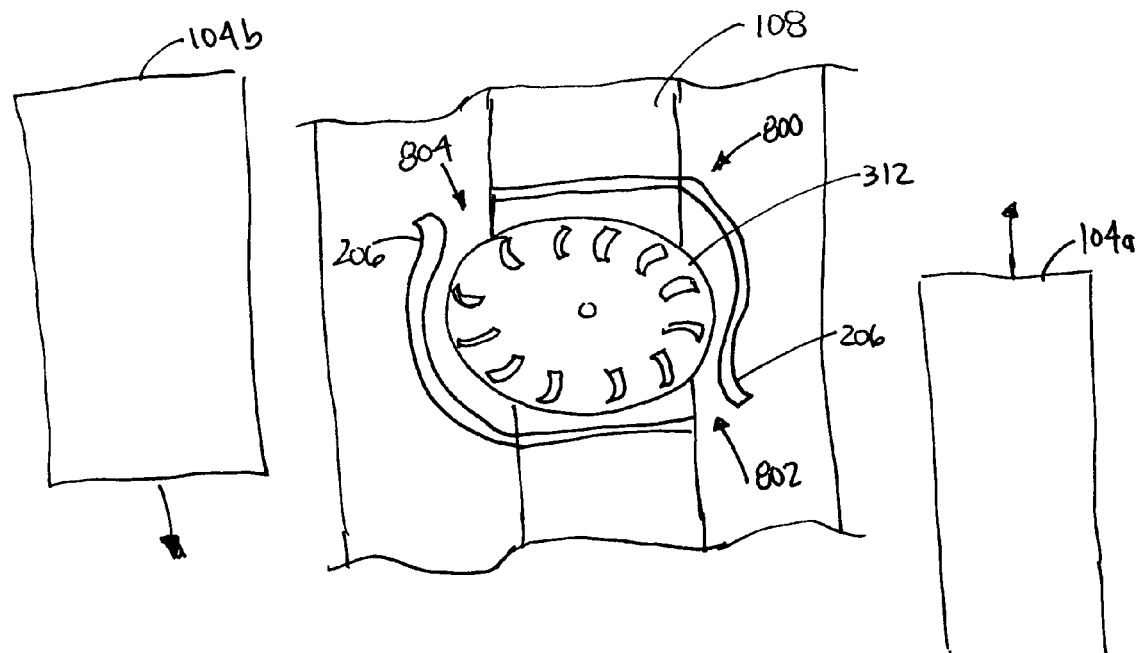

Referring now to FIGS. 8a and 8b, there is illustrated another embodiment of the apparatus of the present invention in which the device 800 has first and second inputs 802, 804 in communication with an air flow from first and second moving vehicles 104a, 104b, respectively. The device 800 of FIGS. 8a and 8b are similar in configuration to that described above with regard to FIGS. 2–4b where like features are referred to with like reference numerals. However, in the device of FIGS. 8a and 8b, each of the airflows directed into the first and second inputs 802, 804 combine to spin the squirrel cage 312 and shaft 310 connected thereto to generate power from the electrical generator 302. Such a device 800 can be used on a roadway divider 108 where moving vehicles move in opposite directions on each side of the divider 108. In this way, one or both of the moving vehicles can be used generate power with the device 800. During a morning commute when traffic is present on one side of the divider 108 and traffic is moving freely on the other side, the device can still operate to generate power. Vice versa, during an evening commute when the traffic situation is reversed, the devices can still generate power from the side in which the traffic moves freely. As discussed above, the device 800 can be mounted to the divider in a number of ways or on other surfaces proximate the roadway and may even be mounted by way of a stand on the roadway itself or to the divider 108. Furthermore, as discussed above, a plurality of the devices 800 can be used, each of which supplies power to a common line and to a means for supplying the power to one of a power grid, energy storage device, and power-consuming device. The inputs 802, 804, as with any of the inlets discussed above, may be covered with an appropriate covering, such as a screen mesh (not shown) to prevent debris from entering the device and damaging and/or clogging the squirrel cage or otherwise hampering the operation of the device. The device can also have seals for preventing moisture from entering the electrical generator, if such electrical generator is susceptible to moisture. Such sealing techniques are well known in the art. Because the squirrel cage and related components are open to the atmosphere, care should be taken to minimize the effect of the atmosphere, such as from moisture, for example by utilizing materials and/or coatings to protect the same.

Figure 9:
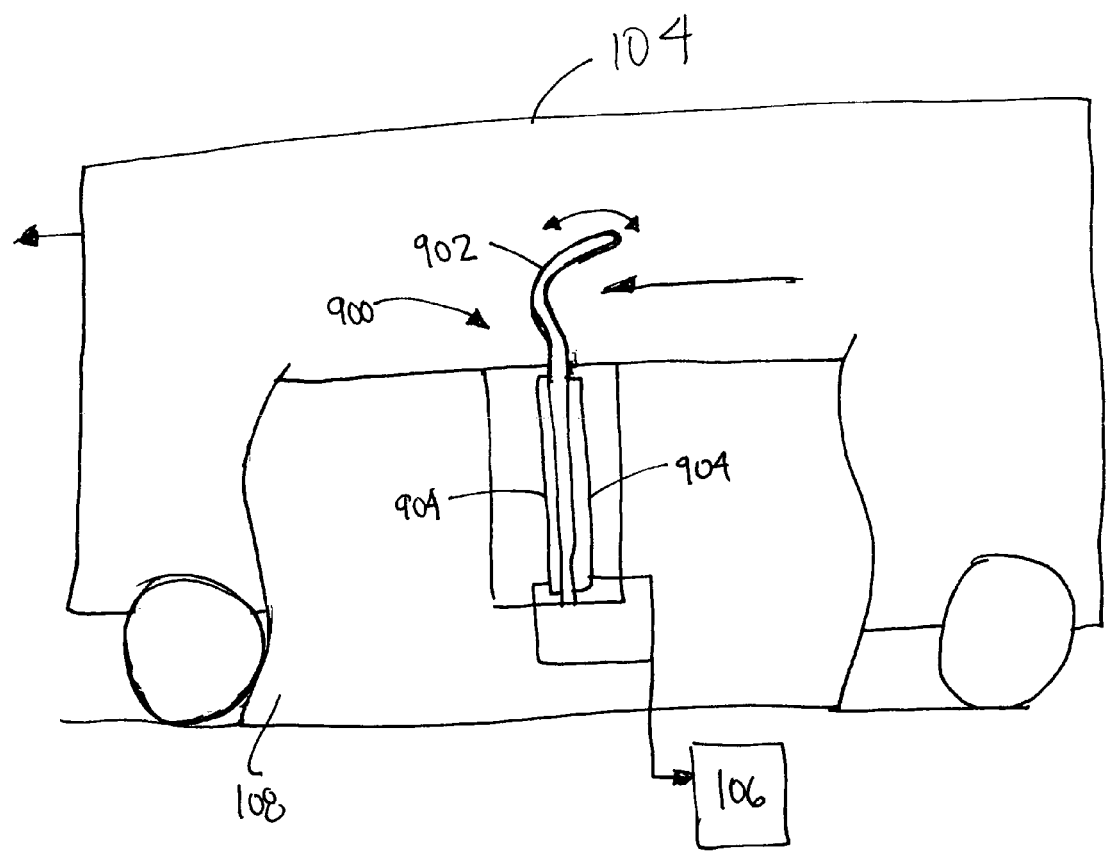
FIG. 9 illustrates a sectional view of a roadway divider having another embodiment of an apparatus for generating power from a moving vehicle.

Referring now to FIG. 9, there is shown a sectional view of a roadway divider 108 having another embodiment of a device for generating power from a passing vehicle 104 where the device utilizes a piezo generator 900. The piezo generator 900 has a vibrating member 902 made from any material that will vibrate or oscillate when subjected to airflow from the passing vehicle 104. The oscillation of the vibrating member 902 may be amplified due to its shape, such as being long, thin and/or slender and having a cup-shaped portion 904 at an end thereof for catching the airflow. The vibrating member 902 has piezo electric material 904 attached thereto, such as at each of two sides of the vibrating member 902. The piezo electric materials 904 are electrically connected to the means 106 for supplying the power to one of a power grid, energy storage device, and power-consuming device. The piezo electric material 904 generates an electric current when subjected to vibration. Piezo electric materials as well as their operation are well known in the art. Thus, as the vibrating member 902 vibrates due to the airflow of the passing vehicle 104, the piezo materials 904 attached thereto produce power which is output to the means 106 for supplying the power to one of a power grid, energy storage device, and power-consuming device. As discussed earlier with devices 102, 800, a plurality of the piezo generators 900 can be provided and can be mounted in or on the roadway divider, or other surfaces proximate the roadway or free standing by way of mounting stands or the like. Those skilled in the art will appreciate that the piezo generator has no moving parts and is not generally affected by moisture and other atmospheric conditions.

Figure 10:
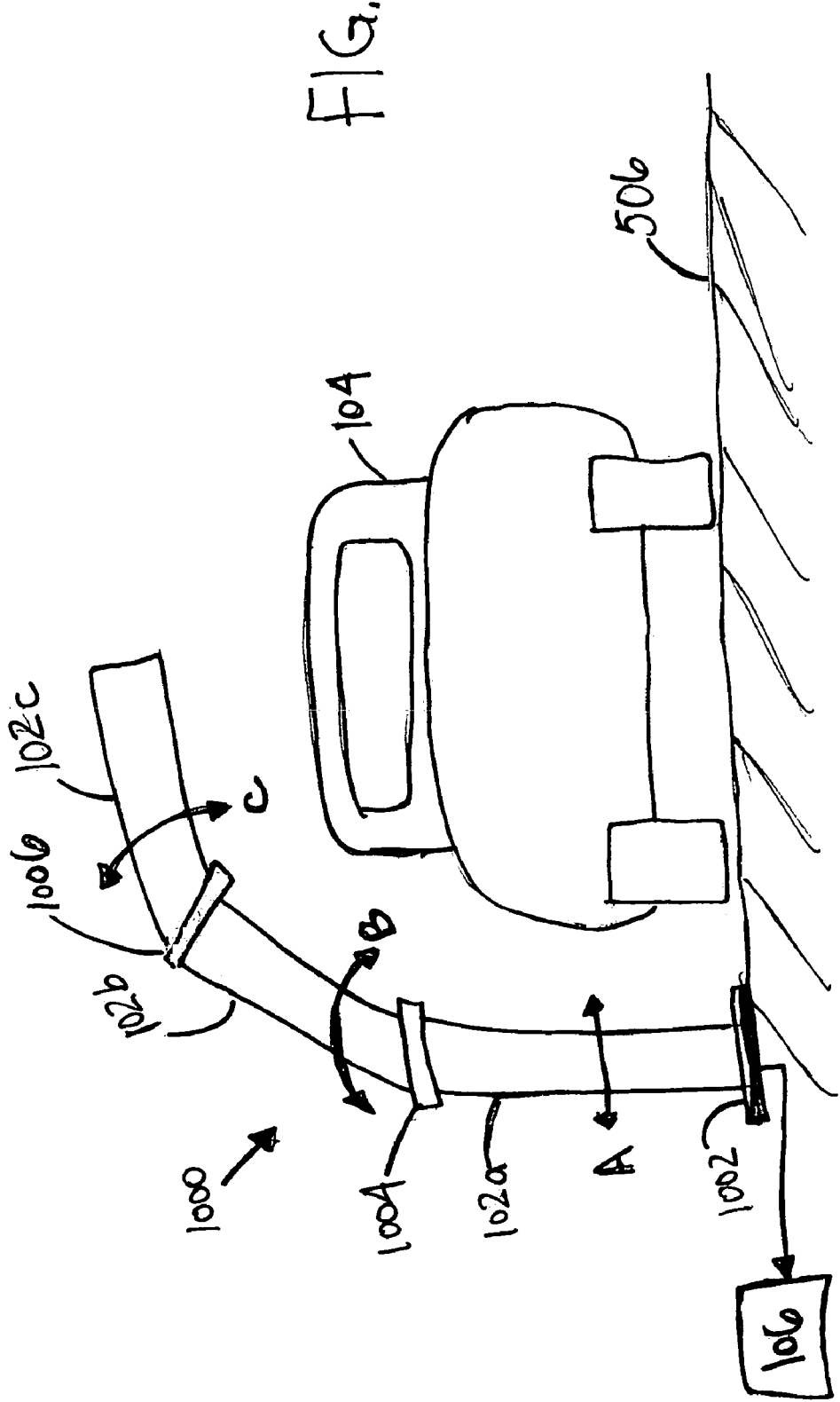
FIG. 10 illustrates a moving vehicle as it passes apparatus of the present invention for generating power from the moving vehicle in which the apparatus is capable of changing its positioning.

Referring now to FIG. 10, there is shown an apparatus 1000 for generating power from a passing vehicle 104. The apparatus 1000 has one or more devices 102 (800) similar to those described with regard to FIGS. 2–4b or 9, preferable the apparatus 1000 has at least two such devices 102 (800). The apparatus 1000 can be mounted to a divider 108 or other surface proximate the roadway 506 as discussed above or, as shown in FIG. 10, mounted directly to the roadway 506. The devices 102 (800) will be referred to by numerals 102a, 102b, and 102c for the remainder of the description, however, such designations are not meant to limit the devices therein to those shown in FIGS. 2–4b. The devices of apparatus 1000 can also be those described above with regard to FIG. 9 or any other such devices now know or later developed capable of generating power from a passing vehicle. Device 102a is mounted to the roadway 506 in such a way so as to be movable at least in the direction of arrow A, such as on a slide 1002 as is known in the art. Device 102b is attached to device 102a by way of a movable joint 1004, such as a ball joint or a rotating joint that permits movement in at least the direction of arrow B. Similarly, device 102c is attached to device 102b by way of a movable joint 1006, such as a ball joint or a rotating joint that permits movement in at least the direction of arrow C. The individual devices 102a–102c of the apparatus 1000 can then be moved to most efficiently generate power from the passing vehicle 104 based on a size and/or shape and/or speed of the passing vehicle 104. Such slide 1002 and joints 1004, 1006 can be lockable into a desired position manually or automatically under the control of an actuator as is well known in the art.

Figure 11:
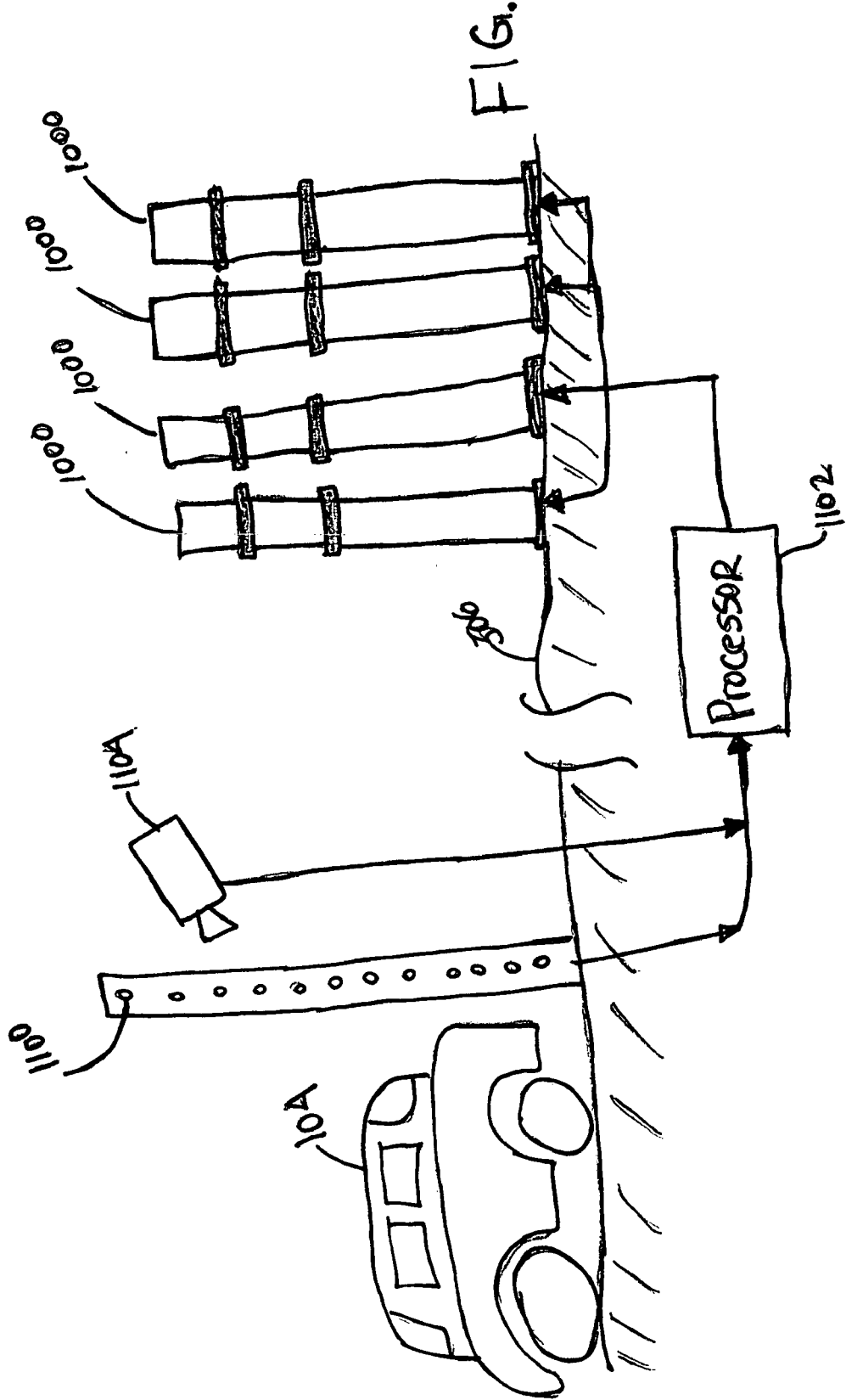
FIG. 11 illustrates several of the apparatus of FIG. 10 in which a characteristic of the moving vehicle is detected downstream of the several apparatus.

Referring now to FIG. 11, a plurality of the apparatus 1000 of FIG. 10 are shown along a path of the passing vehicle 104. The apparatus 1000 of FIG. 11 further has a means for determining a characteristic of the passing vehicle 104 and means for changing a position of the devices 102a–102c based on the characteristic. The characteristic can be an airflow field generated from the passing vehicle 104 where the means for determining a characteristic of the passing vehicle 104 can be one or more sensors 1100 for detecting the airflow field. The sensors 1100 are preferably arranged for determining the airflow at a plurality of positions to thus determine the airflow field. The detection of the airflow field is preferably done just downstream of the passing vehicle 104. The means for changing the position of the devices 102a–102c based on the characteristic can comprise one or more actuators operatively connected to the slide 1002 and/or joints 1004, 1006 for changing the position of the devices 102a–102c based on the detected airflow field. Thus, the configuration of the individual devices 102a–102c of the apparatus 1000 can be tailored to the actual passing vehicle to maximize the power generated therefrom. The sensors 1100 may also detect the speed of the passing vehicle 104 which may be used solely or in combination with the airflow sensors to determine the positioning of the devices 102a–102c. A processor 1102 analyzes the data from the sensors 1100, determines the positioning of the devices 102a–102c and drives the actuators for the slide 1002 and joints 1004, 1006 accordingly.

The characteristic can also be a detected shape, size, and/or speed of the passing vehicle 104 where the means for determining the characteristic of the passing vehicle 104 can be a computer vision system, shown schematically as a camera 1102 for detecting the shape and/or size/and/or speed of the passing vehicle 104 and calculating an expected airflow field therefrom. In which case the means for changing the position of the devices 102a–102c based on the characteristic can be actuators operatively connected to the slide 1002 and/or joints 1004, 1006 for changing the position of the devices 102a–102c based on the calculated expected airflow field. A processor 1102 analyzes the data from the computer vision system, determines the positioning of the devices 102a–102c and drives the actuators for the slide 1002 and joints 1004, 1006 accordingly.

Although three devices 102a–102c are shown in apparatus 1000, more or less can be provided without departing from the scope or spirit of the present invention. Furthermore, although the apparatus 1000 (and 100) are shown on one side of the passing vehicle, they can also be disposed on both sides (as well as above and below) of the passing vehicle 104.

Although the various embodiments of the apparatus and devices disclosed herein are illustrated in groups of several, they may be disposed along relatively long paths of the passing vehicles, such as several miles or longer to generate appreciate amounts of power. They may also be used in smaller groups for generating power for a special purpose, such as lighting a light post or powering an emergency phone. The squirrel cages and electrical generators shown herein are assumed to be capable of efficiently operating for the particular type of vehicle and/or speed of vehicle at the particular location. For example, smaller squirrel cages and generators may be used for slower and/or passenger traffic while larger squirrel cages and generators may be used for faster highway and/or commercial traffic. Other generators may be used for a range of vehicle types and speeds. Furthermore, although squirrel cage types of fans are preferred, other types can be used without limiting the scope or spirit of the present invention.

It is important to note that the apparatus and methods of the present invention do not generate power from the moving vehicles at the expense of the moving vehicle. The moving vehicle is not slowed down due to the apparatus and methods disclosed herein. In fact, the apparatus and methods of the present invention may actually add to the efficiency of the moving vehicles by improving the airflow around the moving vehicle.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. An apparatus for generating power from a moving vehicle, the apparatus comprising:
at least one device for converting an air flow from a passing vehicle into power; and
means for supplying the power to a power-consuming device, wherein the power-consuming device is one of a roadway light and a roadway emergency telephone.

2. The apparatus of claim 1, wherein the body at least one device comprises a mounting means for mounting the at least one device to an exterior surface of a body.

3. The apparatus of claim 2, wherein the mounting means comprises a flange having one or more fastener holes.

4. An apparatus for generating power from a moving vehicle, the apparatus comprising:
   at least one device for converting an air flow from a passing vehicle into power; and
   means for supplying the power to one of a power grid, energy storage device, and power-consuming device;
   wherein the mounting means comprises a stand mounted on an exterior surface of the body.

5. An apparatus for generating power from a moving vehicle, the apparatus comprising:
   at least one device for converting an air flow from a passing vehicle into power;
   means for supplying the power to one of a power grid, energy storage device, and power-consuming device;
   means for determining a characteristic of the passing vehicle; and
   means for changing a position of the at least one device based on the characteristic.

6. The apparatus of claim 5, wherein the characteristic is an airflow field generated from the passing vehicle and the means for determining a characteristic of the passing vehicle comprises one or more sensors for detecting the airflow field.

7. The apparatus of claim 6, wherein the means for changing the position of the at least one device based on the characteristic comprises one or more actuators operatively connected to the at least one device for changing the position of the at least one device based on the detected airflow field.

8. The apparatus of claim 5, wherein the characteristic is at least one of a detected shape, size, and speed of the passing vehicle and the means for determining a characteristic of the passing vehicle comprises a computer vision system having at least one camera for detecting at least one of the detected shape, size, and speed of the passing vehicle and calculating an expected airflow field therefrom.

9. The apparatus of claim 8, wherein the means for changing the position of the at least one device based on the characteristic comprises one or more actuators operatively connected to the at least one device for changing the position of the at least one device based on the calculated expected airflow field.

10. A roadway divider for generating power from a moving vehicle, the roadway divider comprising:
    a body;
    at least one device for converting an air flow from a passing vehicle into power supported by the body; and
    power transmission means for supplying the power to a power-consuming device, wherein the power-consuming device is one of a roadway light and a roadway emergency telephone.

11. A roadway for generating power from a moving vehicle, the roadway divider comprising:
    a body;
    at least one device for converting an air flow from a passing vehicle into power supported by the body;
    power transmission means for supplying the power to one of a power grid, energy storage device, and power-consuming device; and
    an electrical connector for connecting a power output from the roadway divider to another roadway divider.

12. The roadway divider of claim 11, the body further having a mechanical connector for mating the body of the roadway divider to a body of the other roadway divider, wherein the electrical connector operatively connects with another electrical connector of the other roadway divider upon mating of the mechanical connector to the body of the other roadway divider.

13. A roadway divider for generating power from a moving vehicle, the roadway divider comprising:
    a body;
    at least one device for converting an air flow from a passing vehicle into power supported by the body; and
    power transmission means for supplying the power to one of a power grid, energy storage device, and power-consuming device;
    wherein the at least one device is fastened to an exterior surface of the body.

14. The roadway divider of claim 10, wherein the at least one device is a piezo generator, the piezo generator having a piezo member wherein the air flow vibrates the piezo member to produce the power.

15. The roadway divider of claim 13, wherein the at least one device is mounted to a side exterior surface of the body.

16. The roadway divider of claim 13, wherein the at least one device is mounted to a top exterior surface of the body.

17. The roadway divider of claim 16, wherein the at least one device is mounted at an angle with respect to an axis perpendicular to a roadway upon which the body is placed.

18. The roadway divider of claim 17, further comprising means for varying the angle.

19. A system for generating power from a moving vehicle, the system comprising:
    at least one device for converting an air flow from a passing vehicle into power; and
    means for supplying the power to one of a power grid, energy storage device, and power-consuming device;
    wherein the at least one device is one of mounted on or in an interior surface of a tunnel or overpass through which the moving vehicle passes and mounted on or in a roadway surface over which the moving vehicle passes.

* * * * *